UNITED STATES PATENT OFFICE.

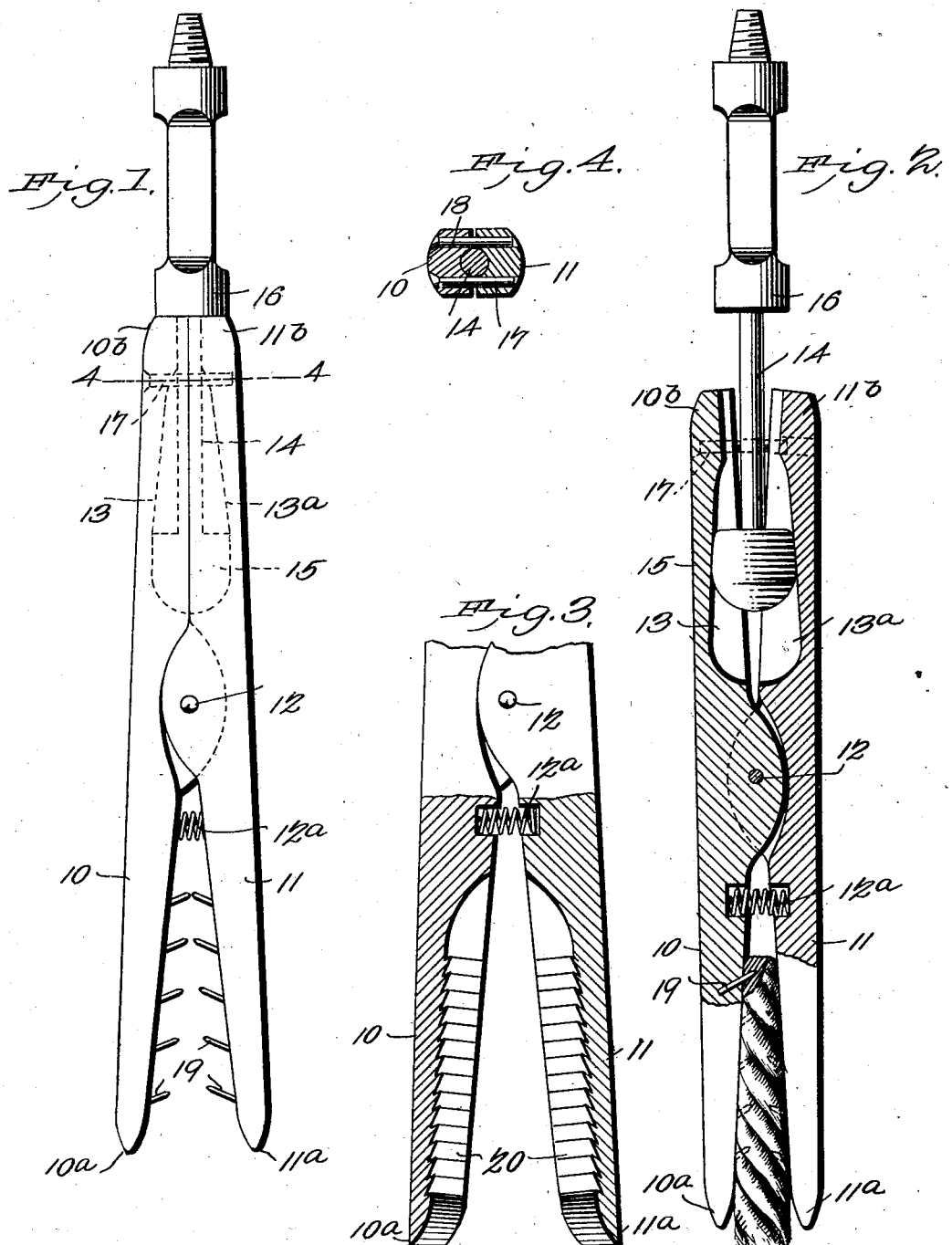

WASHINGTON SMITH AND LEWIS PIGGOTT, OF BELLEVILLE, WEST VIRGINIA.

FISHING IMPLEMENT FOR OIL-WELLS.

SPECIFICATION forming part of Letters Patent No. 720,078, dated February 10, 1903.

Application filed April 16, 1902. Serial No. 103,188. (No model.)

*To all whom it may concern:*

Be it known that we, WASHINGTON SMITH and LEWIS PIGGOTT, citizens of the United States, residing at Belleville, in the county of Wood and State of West Virginia, have invented a new and useful Fishing Implement for Oil-Wells, of which the following is a specification.

This invention relates to implements employed for recovering lost ropes, drill-rods, and the like from oil and other wells; and the invention consists in certain novel features of the construction, as hereinafter shown and described, and specifically pointed out in the claim.

In the drawings illustrative of the invention, Figure 1 is a side view of the implement open or expanded, and Fig. 2 is a sectional view of the implement open. Fig. 3 represents a modification in the construction of the gripping-jaws, partially in section. Fig. 4 is a transverse section on the line 4 4 of Fig. 1.

In the implement is comprised two opposing jaw members 10 and 11, pivotally united at an intermediate point, as at 12, and with a spring $12^a$ between the members 10 11, just below the hinge-point and adapted to maintain the jaw members normally distended, as in Fig. 1. The jaw members are formed with uniform exterior outlines, so that when distended, as in Fig. 1, the lower extremities $10^a$ $11^a$ will be the widest part of the implement and the jaws will incline inwardly in straight exterior lines to the opposite ends $10^b$ $11^b$ and without projections at the hinge-point 12. By this means when the implement is being lowered into the well the largest part will be constantly downward and any tendency of the implement to engage obstructions which the lowermost ends succeed in passing will be obviated, as hereinafter more fully explained.

The members 10 and 11 above the hinge 12 are formed with upwardly and inwardly inclined recesses, as at 13 $13^a$, and between these recesses is a draft-rod 14, having a "head" 15 on its lower end engaging the recesses. The rod 14 will be formed with an enlargement 16, and above this enlargement the means 17 for the attachment of the draft cable or chain will be arranged. The enlargement 16 will be so disposed upon the rod 14 that when the head 15 is at its lowermost point, as in Fig. 1, the projection will engage the ends $10^b$ $11^b$ of the jaw members, and thereby serve as a stop to limit the downward movement of the rod.

Transversely disposed through the upper ends of the jaw members 10 and 11 are stop-rods 17 18, each secured by one end in one of the jaw members and movable through the opposite jaw member. The rods thus serve the twofold purpose of guides for the lateral movement of the jaw members to relieve the hinge portion 12 from undue side strains and as stops with which the head 15 will engage when the rod 14 is elevated to its highest point, and thus limit the upward movement and prevent the rod from being entirely withdrawn from between the jaw members.

The adjacent faces of the jaw members below the hinge-point 12 are provided with means for engaging the rope, rod, or other article in the well. When the article to be engaged is a rope or other yieldable article or material, the opposing faces will be provided with inwardly and upwardly projecting spurs, as at 19 in Figs. 1 and 2, and when the article to be engaged is a rod or other hard substance the opposing faces will be provided with teeth or sharp-edged notches 20. The implement can thus be adapted to engage any of the various impediments that are usually met with in oil and similar wells and successfully employed to remove them. The spring $12^a$ will be of just sufficient strength to sustain the weight of the jaw members and maintain them suspended when not in action, as in Fig. 1, but which will not prevent the jaws being forcibly closed by the upward movement of the head 15 when it is required to engage the object in the well. When the implement is to be used, therefore, it will descend into the well in its distended form, as in Fig. 1, and the lower portions $10^a$ $11^a$ being the most widely extended part of the implement any obstruction which these parts pass will not offer any resistance to the remainder of the implement, as the inclination is constantly and uniformly inward and upward from the lowermost to the uppermost point, as before described. This is an important and valuable feature of the invention and adds materially to the efficiency of the implement. The enlargement 16 also serves an important purpose in preventing any undue downward strain upon the hinge portion of the implement, but causing all the downward strains to be borne longitudinally of the jaw members and relieving the pivot 12 of a large percentage of the strains.

Having thus described our invention, what we claim is—

An implement of the character described, comprising opposing jaw members pivotally connected, transverse guide-rods spaced apart and movably engaging the jaw members near their upper ends, a draft-rod operating between said jaw members and embraced by said guide-rods and with an enlargement upon its lower end in operative engagement with said jaw members, substantially as described.

In testimony that we claim the foregoing as our own we have hereto affixed our signatures in the presence of two witnesses.

WASHINGTON SMITH.
LEWIS PIGGOTT.

Witnesses:
P. F. WELLS,
ERHIT CROOKS.